(12) United States Patent
Johnson et al.

(10) Patent No.: US 7,658,780 B2
(45) Date of Patent: Feb. 9, 2010

(54) METHOD OF TREATMENT OF WOOD ASH RESIDUE

(75) Inventors: Richard Lyle Johnson, Vegreville (CA); Richard Eugene Kuzub, Sherwood Park (CA); Albert Joseph Liem, Vegreville (CA); Clifford Paul Ronden, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 446 days.

(21) Appl. No.: 11/461,947

(22) Filed: Aug. 2, 2006

(65) Prior Publication Data

US 2007/0062234 A1  Mar. 22, 2007

Related U.S. Application Data

(60) Provisional application No. 60/704,580, filed on Aug. 2, 2005.

(51) Int. Cl.
*C05F 11/00* (2006.01)
*C01F 5/24* (2006.01)

(52) U.S. Cl. .......................................... 71/23; 423/430
(58) Field of Classification Search .................. 71/23; 423/419.1, 430, DIG. 5
See application file for complete search history.

(56) References Cited

U.S. PATENT DOCUMENTS

| | | | |
|---|---|---|---|
| 4,069,063 A | 1/1978 | Ball | |
| 4,325,919 A * | 4/1982 | Queneau et al. | 423/61 |
| 4,635,724 A | 1/1987 | Bruckdorfer | |
| 4,668,541 A | 5/1987 | Fagerlund | |
| 4,975,121 A | 12/1990 | Sakuta | |
| 5,009,713 A | 4/1991 | Sakuta | |
| 5,174,820 A | 12/1992 | Sakuta | |
| 5,183,694 A | 2/1993 | Webb | |
| 5,624,493 A | 4/1997 | Wagh | |
| 6,413,291 B1 | 7/2002 | Wommack | |
| 6,989,142 B2 * | 1/2006 | Liu et al. | 424/49 |

FOREIGN PATENT DOCUMENTS

| | | |
|---|---|---|
| EP | 0 181 261 A1 | 5/1986 |
| EP | 0 242 646 A1 | 10/1987 |
| GB | 1 569 511 | 6/1980 |

(Continued)

OTHER PUBLICATIONS

Roy Roberson, "Electrical conductivity of soil a key to precision farming". Farm Press Editorial Staff. Apr. 28, 2006. <http://southeastfarmpress.com/news/042806-Khalilian-conductivity/> Accessed Mar. 10, 2009.*

(Continued)

*Primary Examiner*—Stuart Hendrickson
*Assistant Examiner*—Richard M Rump
(74) *Attorney, Agent, or Firm*—Christensen O'Connor Johnson Kindness PLLC

(57) ABSTRACT

A method of treatment of wood ash residue. A first step involves wetting the wood ash residue. A second step involves reacting the wetted wood ash residue with carbon dioxide gas. Mineral oxides and hydroxides are converted to carbonates, thereby reducing the caustic nature of the wood ash residue. A third step involves continuing to react the wetted wood ash residue until the resulting ash residue is substantially carbonated.

5 Claims, 4 Drawing Sheets

FOREIGN PATENT DOCUMENTS

| | | |
|---|---|---|
| JP | 11 131804 | 5/1999 |
| WO | 85 00587 | 2/1985 |

OTHER PUBLICATIONS

Anthony, E.J., et al., "Pacification of High Calcic Residues Using Carbon Dioxide," Waste Management 20(1):1-13, 2000.

Bearat, H., et al., "Magnesium Hydroxide Dehydroxylation/Carbonation Reaction Process: Implications for Carbon Dioxide Mineral Sequestration," Journal of the American Ceramic Society 85(4):742-748, 2002.

Eriksson, H.M., "Short-Term Effects of Granulated Wood Ash on Forest Soil Chemistry in SW and NE Sweden," Scandinavian Journal of Forest Research, Suppl. 2:43-55, 1998.

Freyssinet, P., et al., "Chemical Changes and Leachate Mass Balance of Municipal Solid Waste Bottom Ash Submitted to Weathering," Waste Management 22(2):159-172, 2002.

Holmberg, S.L., et al., "Drying of Granulated Wood Ash by Flue Gas From Saw Dust and Natural Gas Combustion," Resources, Conservation and Recycling, 38:301-316, 2003.

Holmberg, S.L., and T. Claesson, "Mineralogy of Granulated Wood Ash From a Heating Plant in Kalmar, Sweden," Environmental Geology 40:820-828, 2001.

Holmberg, S.L., and T. Claesson, "Wood Ash—A Natural Nutrient Source for Compensation of Nutrient Deficiency in Forest Soils Caused by Acidification," Proceedings of the 17th World Congress of Soil Science, Bangkok, Thailand, Aug. 14-21, 2002, pp. 376-1-376-8.

Lomander, A., et al., "Recirculating Wood Ash—Theory, Practise and Recommendations," Regional Forestry Board of Vastra Gotaland in Sweden, draft of international teaching package, available 2005.

* cited by examiner

METHOD OF TREATMENT OF WOOD ASH RESIDUE

FIELD OF THE INVENTION

The present invention relates to a method of treatment of wood ash residues, so that they can be mixed with soil without detrimental effect to plant growth.

BACKGROUND OF THE INVENTION

Carbonaceous materials, such as wood, contain mineral components, known as ash, that do not combust when burned in air, regardless of combustion temperature. Alkaline minerals, formed from alkali or alkali earth metals, form one part of the ash. Due to the elevated temperatures achieved during combustion, normally exceeding 850° C., a large proportion of the alkaline minerals are converted from their carbonate form to their oxide form through the loss of carbon dioxide. Wood ash containing primarily the oxide form of alkaline minerals is normally extremely alkaline, with pH values of 12.0 or more, and heavily laden in soluble salts, as evidenced by electrical conductivity values of 20 deciSiemens per meter (dS/m) or more.

Wood ash is applied on land to increase soil pH, buffer soil against decreases in pH due to acid addition, add calcium and magnesium for improved plant growth and soil structure, and increase the supply of micronutrients. Most plants grow optimally in soil having a pH range of from 6.0 to 8.0. The limitations of using wood ash residue, either directly as a soil amendment or as a major component of other fertilizers, are its excessively high pH and high content of soluble salts. For example, wood ash has pH values as high as 13.0, which can cause i) deficiencies in micronutrients such as iron, copper and zinc; ii) 'toxic shock' to young seedling plants; and iii) localized mineralogical changes in the soil environment where it is placed. Soluble salt contents of wood ash, measured as electrical conductivity (EC), can reach 40 dS/m. Depending on the amount of wood ash applied per year, these elevated levels of pH and soluble salts can be detrimental to soil quality, crop production, and water quality.

In an article published in Resources, Conservation and Recycling 38 (2003) 301-3116 entitled "Drying of granulated wood ash by flue gas from saw dust and natural gas combustion", S. L. Homberg, T. Claesson, M. Abul-Milh, and B. M. Steenari; the authors investigated how drying by flue gas affected the chemical composition and properties of wood ash. The conclusion of the Homberg et al is that drying by flue gas was an environmentally acceptable way to dry granules in terms of effects on hardening and the chemical composition of the granules to make them less reactive.

SUMMARY OF THE INVENTION

According to the present invention there is provided a method of treatment of wood ash residue. A first step involves wetting the wood ash residue. A second step involves reacting the wetted wood ash residue with carbon dioxide gas. Mineral oxides and hydroxides are converted to carbonates, thereby reducing the caustic nature and the soluble salt content of the wood ash residue A third step involves continuing to react the wetted wood ash residue until the resulting ash residue is substantially carbonated.

BRIEF DESCRIPTION OF THE DRAWINGS

These and other features of the invention will become more apparent from the following description in which reference is made to the appended drawings. The drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
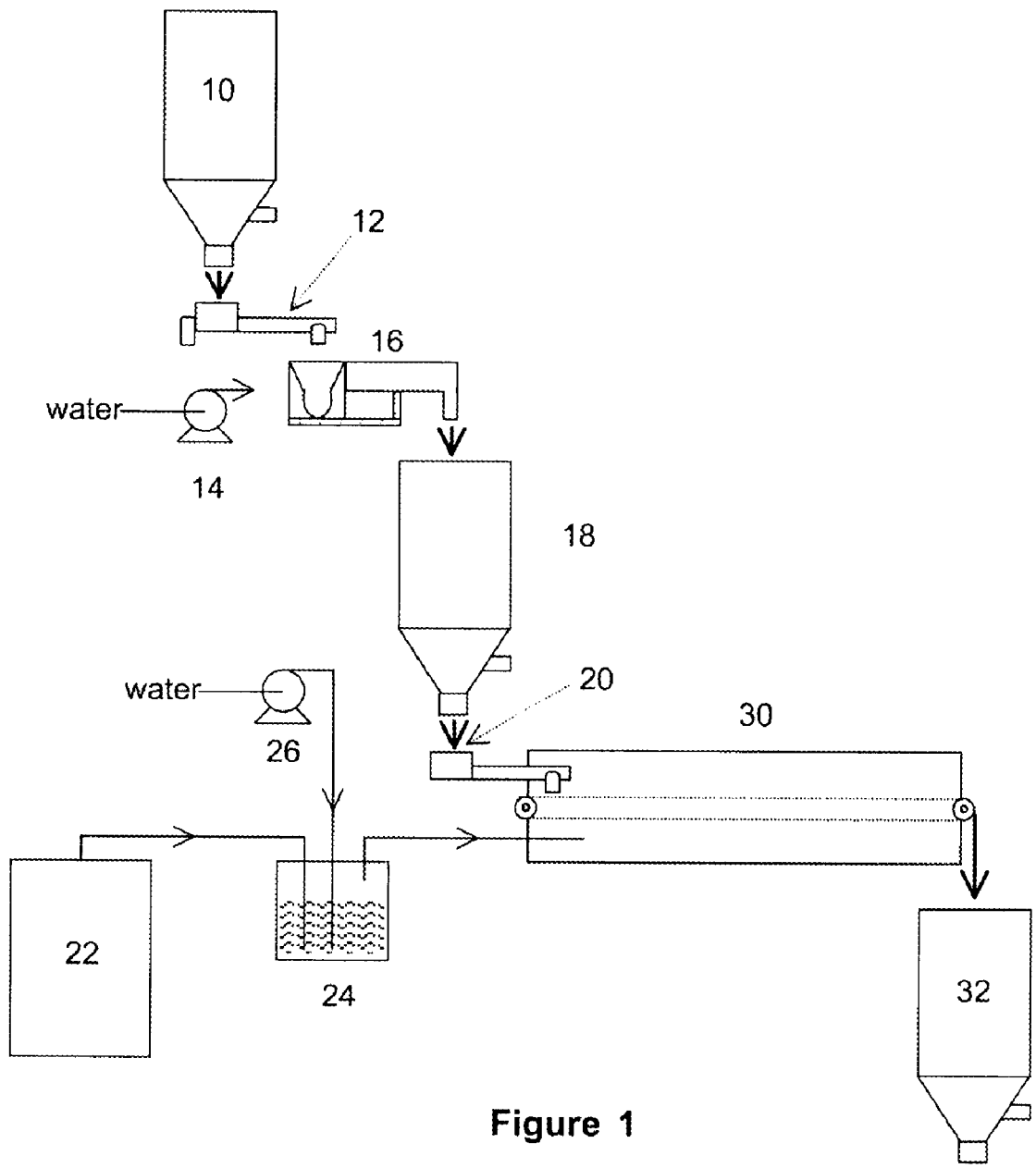
FIG. 1 is a block diagram illustrating an example of the type of equipment and flow scheme of the preferred embodiment to be used in practicing the present invention which hereafter will be described as "continuous carbonation" methodology.

In FIG. 1, dry alkaline wood ash is loaded into bin 10 and is discharged by dry ash feeder 12 at a predetermined rate into mixer 16 along with water from pump 14 fed to the mixer at a rate sufficient to achieve the desired degree of wetting. After sufficient residence time in mixer 16 to ensure intimate contact between the alkaline ash and the water, the wetted mixture is discharged from mixer 16 into conditioning bin 18 and stored for a period of time sufficient to ensure that substantially all of the water has reacted with the alkaline ash.

After conditioning, wetted material is then discharged at a predetermined rate from bin 18 by feeder 20 into a solid-gas contactor 30 along with a predetermined amount of carbon dioxide gas under pressure from storage source 22 which is moistened in humidifier 24 that is kept supplied with water by means of water pump 26. The carbon dioxide gas could be pure or mixed with air or other gases, depending on the source. The wetted alkaline ash is deposited on a continuously-moving "through-circulation screen-conveyor belt" in one example of a solid-gas contactor 30, and pressurized, moistened carbon dioxide gas is introduced into the alkaline ash from below the perforated belt. Other examples of solid-gas contactors include rotary drum, rotary tray, and fluidized bed designs. In all cases, pressurized, moistened carbon dioxide gas is introduced into the solid-gas contactor type with the pre-wetted alkaline ash in appropriate amounts to convert oxides and hydroxides to carbonates. The solid-gas contactors are designed to maximize the contact between alkaline ash and carbon dioxide and to provide for continuous processing.

After reacting the alkaline ash with carbon dioxide gas, the carbonated ash is discharged from the solid-gas contactor 30 to a carbonated ash storage bin 32.

DETAILED DESCRIPTION OF THE ALTERNATIVE EMBODIMENT

Figure 2:
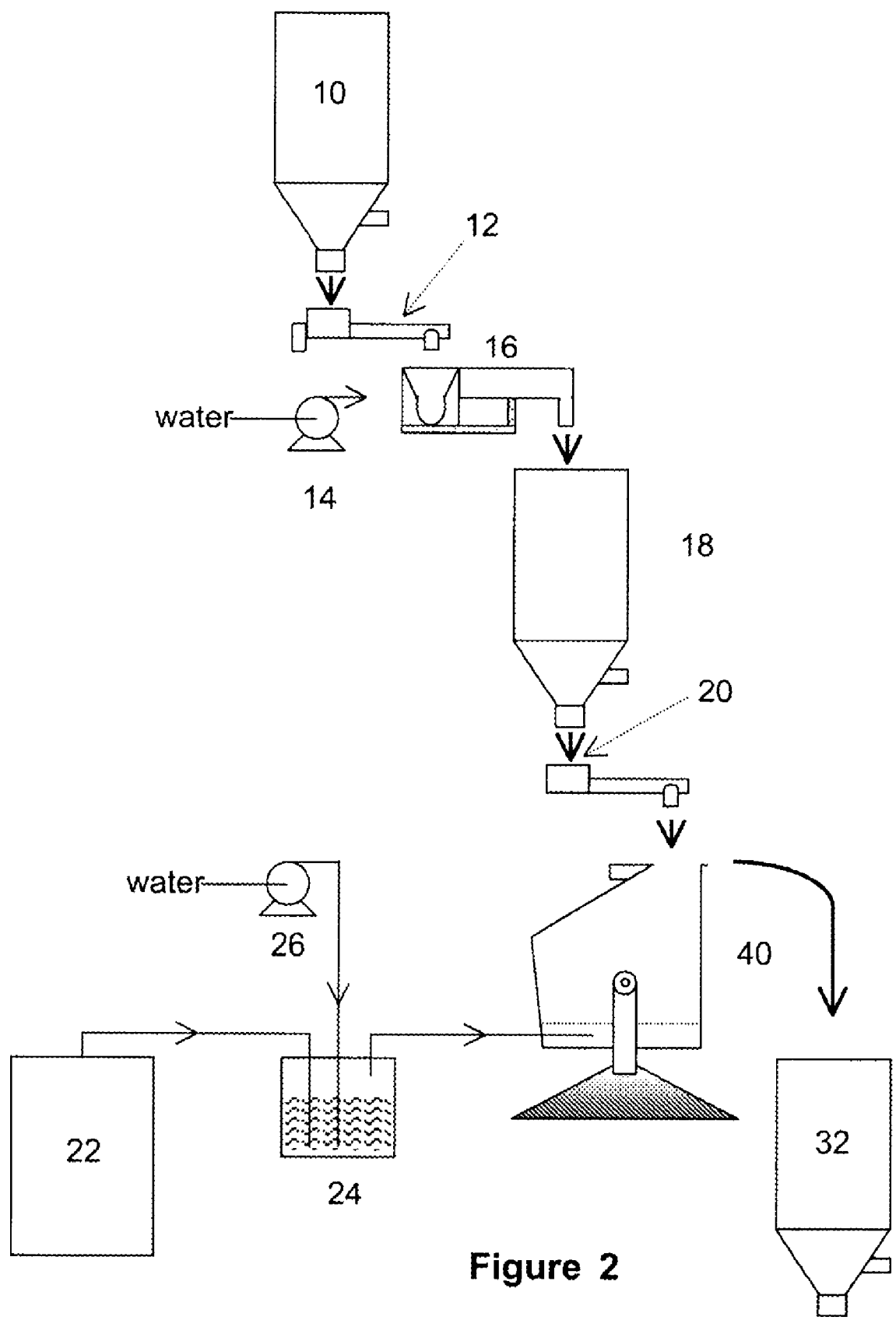
FIG. 2 is a block diagram illustrating an example of the type of equipment and flow scheme of an alternative embodiment to be used in practicing the present invention which hereafter will be described as "batch carbonation" methodology.

In FIG. 2, the alkaline ash and water are mixed exactly as described above. Also, the wetted ash is loaded and discharged from a conditioning bin 18 to a moist ash feeder 20, and a predetermined amount of humidified carbon dioxide (22, 24, 26) is prepared as described above. In FIG. 2, however, the humidified carbon dioxide and wetted ash are brought into contact in a packed bed contactor 40, known as a "batch" contactor. The humidified carbon dioxide is passed through the moist ash in the packed bed contactor from the bottom of the contactor. After carbonation, the packed bed reactor 40 is emptied, by rotating it on its axis, into a carbonated ash storage bin 32.

REFERENCE NUMERALS

- 10 dry ash storage bin
- 12 dry ash feeder
- 14 water pump
- 16 mixer
- 18 conditioning bin
- 20 moist ash feeder
- 22 carbon dioxide under positive pressure
- 24 carbon dioxide humidifier
- 26 water pump to supply humidifier
- 30 solid-gas contactor (through-circulation screen-conveyer belt in this example)
- 32 carbonated ash storage bin
- 40 packed bed contactor ("batch" contactor)

Operation

In operation one mixes alkaline ash with a predetermined amount of water to ensure that all ash particles are covered by a water film. In contact with water, metal oxides are "slaked" to form metal hydroxides (calcium is used as an example of the metal oxides):

$$CaO + H_2O \rightarrow Ca(OH)_2$$

The wetted ash, now containing metal hydroxides, is metered into a solid-gas contactor along with a predetermined amount of humidified carbon dioxide gas. The carbon dioxide dissolves in the water film surrounding the ash particle producing carbonate ions according to the following reaction.

$$CO_2 + H_2O \leftrightarrow 2H^+ + CO_3^-$$

As the carbon dioxide gas and ash particles mix in the solid-gas contactor ("continuous carbonation" methodology) or in the packed bed contactor ("batch carbonation" technology), the metal hydroxides are converted to carbonates calcium is used as an example of the metal hydroxides).

$$Ca^{++} + CO_3^- \leftrightarrow CaCO_3$$

$$H^+ + OH^- \leftrightarrow H_2O$$

When alkaline ash is reacted first with water and then with carbon dioxide and the alkaline metals and alkaline earth metals are converted to their carbonate forms, two chemical changes occur:

(1) the pH of ash is decreased to 8.7 or lower, and (2) the soluble salt content, as measured by electrical conductivity, is reduced dramatically.

The contacting methods included bubbling carbon dioxide through water-saturated mixtures of wood ash ("static" and "once-through bubbling"), slurries of ash and water ("recycled bubbling"), and barely moistened preparations ("thin film") of wood ash and water. The "thin film" approach was preferred as best results were achieved. With this approach less than 10% water was added by weight. In some tests 95 parts wood ash was mixed with 5% water as determined by weight.

As evidence of these two changes, the results obtained with "Pulp Mill Boiler Ash" (wood ash) are reported in the Table below. The wood ash was generated in the hog fuel boiler in the West Fraser Timber Co. Ltd. (formerly Weldwood of Canada) pulp mill in Hinton, Alberta, Canada. The pH and electrical conductivity measurements were conducted in the slurry or filtrate that was generated by thoroughly mixing solid (wood ash or carbonated wood ash) with distilled water at a weight ratio of 1 to 5. The pH and electrical conductivity measurements were done using appropriate meters.

The following shows a summary of the results. The pH of the wood ash was about 12.7, close to that of pure calcium hydroxide. When sufficient contact times were provided, the resulting average pH after carbonation was 8.3, with a standard deviation of 0.6. This corresponds closely to the pH of pure calcium carbonate. Therefore, the results support the validity of the postulated carbonation mechanism.

The average reduction in electrical conductivity was 8.4 dS/m, with a standard deviation of 3.4 mS/cm. This is statistically significant at a 95% confidence level. Therefore, we contend that the proof-of-concept has been successfully demonstrated.

TABLE

Summary of carbonation results

| Contacting Method* | Initial** pH | Initial** EC dS/m | After Carbonation*** pH | After Carbonation*** EC dS/m | Note | Reduction pH | Reduction EC dS/m |
|---|---|---|---|---|---|---|---|
| 1. Static Exposure | 12.7 | 20.9 | 8.5 | 6.3 | A | 4.2 | 12.9 |
| Static Exposure | | | 10.0 | 7.4 | A | 2.7 | 11.8 |
| 2. Once-through Bubbling(i) | | | 10.1 | 10.7 | A | 2.6 | 8.5 |
| Once-through Bubbling(ii) | | | 9.4 | 9.7 | A | 3.3 | 9.5 |
| Once-through Bubbling(iii) | | | 9.7 | 7.9 | A | 3.0 | 11.3 |
| 3. Recycled Bubbling | 12.7 | 17.5 | 7.4 | 15.8 | A | 5.3 | 3.4 |
| Recycled Bubbling | 12.7 | 18.6 | 8.9 | 14.1 | A | 3.8 | 5.1 |
| Recycled Bubbling(iv) | 12.9 | 19.7 | 8.5 | 10.6 | A | 4.2 | 8.6 |
| 4. Thin film (ground)(v) | 12.0 | 16.5 | 8.2 | 12.0 | A | 3.8 | 4.5 |
| Thin film (unground)(vi) | 11.6 | 18.6 | 8.0 | 11.7 | A | 3.6 | 6.9 |
| Thin film (ground)(vii) | 12.0 | 16.5 | 8.3 | 12.1 | B | 3.6 | 4.4 |
| Thin film (unground)(vii) | 12.0 | 16.5 | 8.1 | 11.5 | B | 3.9 | 5.1 |

*Contact times: i) 5 min, ii) 15 min, iii) 20 min, iv) 1 hr, v) 2 hr, vi) 3 hr, vii) 8 hr.
**Based on average values of un-carbonated ash.
***A: 100% $CO_2$; B: 20% $CO_2$

CONCLUSIONS

We have demonstrated the use of carbon dioxide gas to reduce the pH and electrical conductivity of wood ash. Carbonated wood ash, with its lower pH and electrical conductivity values, is of more value as a soil amendment and fertilizer. Although carbonation is a recognized process in the scientific and engineering literature, it has been applied to few industrial products. We observe that:

1. Carbonation reduces the level of soluble salts of wood ash residue by 30%-40%.
2. Carbonation reduces the level of pH of wood ash residue to below 8.7 or less.
3. "Thin film" carbonation, or a method for carbonating mineral matrices at very low moisture contents—less than 10% water as determined by weight gave the best results and was also more environmentally friendly and efficient.

One of the current limitations to the spreading of wood ash on land as a liming agent or fertilizer is its excessive content of soluble salts. This carbonation technology reduces soluble salts and would remedy that limitation. The "thin film" carbonation using minimal water eliminates the need to treat or dispose of wastewater after carbonation, or the need to dry wood ash prior to or after pelletization. This carbonation technology, due to the minimization of water in the process, is cheaper and more efficient than other systems of carbonation. Carbonation is a means of sequestering carbon dioxide from the atmosphere into a stable, solid product. Although eventually the carbonate form in the solid product will decompose, upon acidification, to carbon dioxide again, it could be centuries or even millennia before carbon dioxide is re-emitted. If carbonated wood ash is applied to soil, re-emitted carbon dioxide will be taken up by growing plants as a part of photosynthesis and stabilized again. Hence, wood ash carbonation is a means of reducing one of the principal components of climate change.

Summary of Findings

Figure 3:
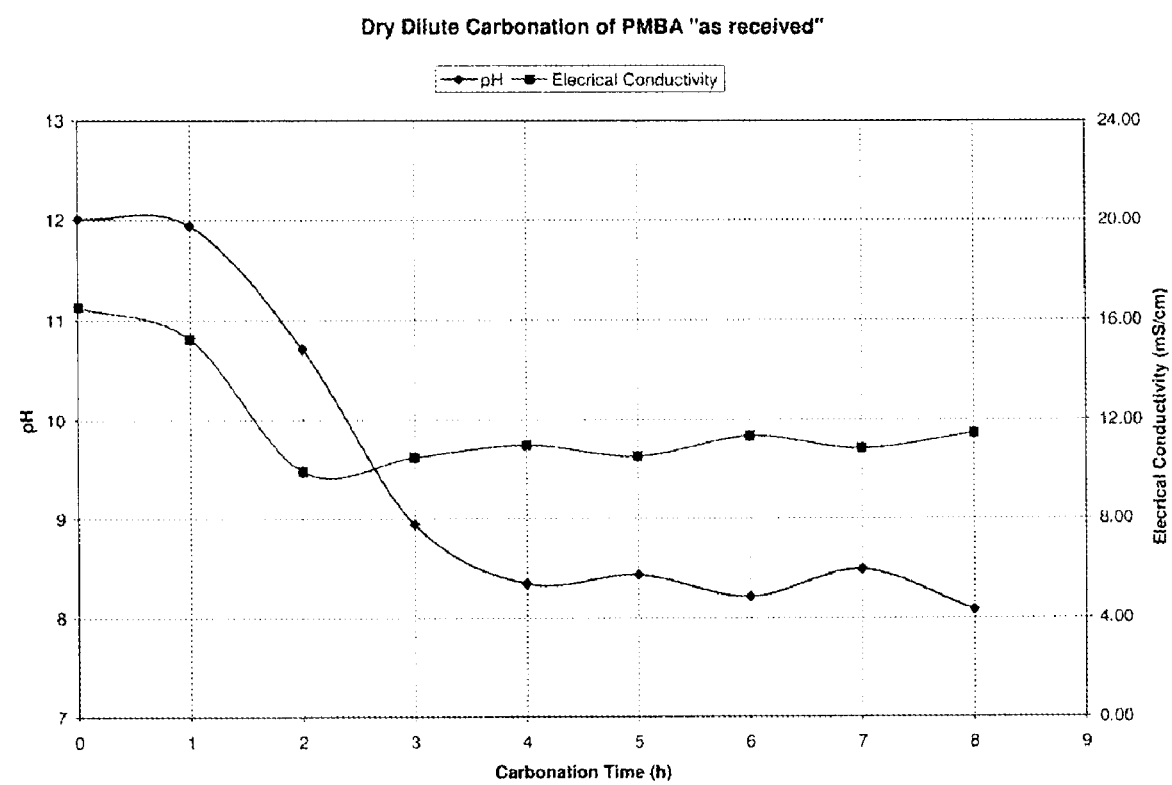
FIG. 3 is a graph illustrating pH and electrical conductivity over time of dry dilute carbonation.
Figure 4:
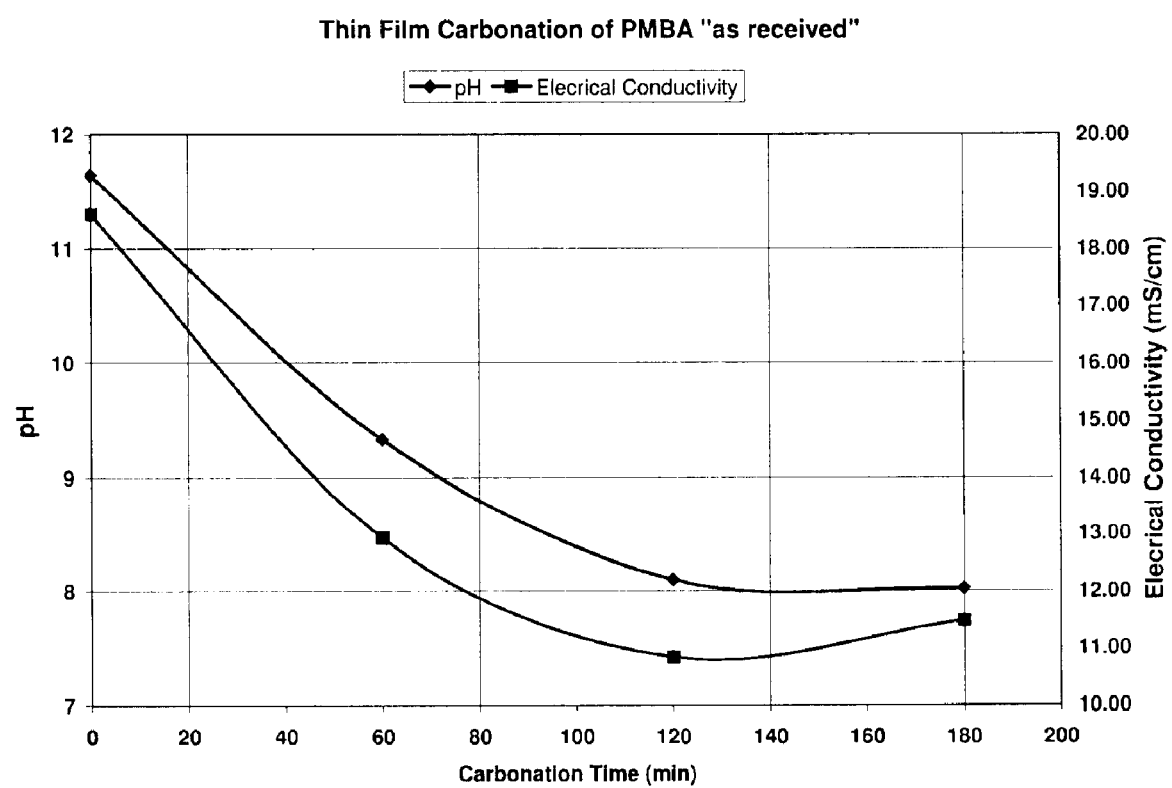
FIG. 4 is a graph illustrating pH and electrical conductivity over time of thin film carbonation.

The carbonation levels required to achieve a successful result are difficult to quantify. They depend upon a number of factors. One factor is the pH and electrical conductivity of the ash prior to treatment. Another factor is the quantity of soil that the ash will be mixed with after treatment. Will it be mixed in a 2000 parts soil to 1 part ash or will it be mixed in a 200 pails soil to 1 part ash. A further factor is the pH and electrical conductivity of the soil with which the ash is to be mixed. Having noted these factors, the objective is to achieve full carbonation, or near to it, in order to get to desired pH and electrical conductivity levels. There may be circumstances in which full carbonation is not practical, whereas 80% carbonation achievable. Any carbonation level of 80% or more should, therefore, be considered to be "substantially" carbonated. There may be circumstances where you have reached both your desired pH level and electrical conductivity level targets and there appears to be little point in continue with further carbonation. It is important that both pH and electrical conductivity targets be reached. An excessively high electrical conductivity level will be harmful to plants in and of itself. One can attain a desirable pH level and still have an excessively high electrical conductivity level. Although it is preferred that one monitor both pH and electrical conductivity, when electrical conductivity targets are reached there is also a reduction in pH. In the tests that were performed the electrical conductivity targets was under 15 dS/m. When the wood ash residue is substantially carbonated, a realistic target is a 30%-40% reduction in electrical conductivity. When wood ash residue is substantially carbonated, a realistic target for pH is 8.7 or less. Carbonation is a matter of exposure to carbon dioxide over time. Virtually any concentration of carbon dioxide can be used, but the time needed to achieve full carbonation increases as the concentration of carbon dioxide is reduced. This is demonstrated by the two graphs appearing in FIGS. 3 and 4. The graph in FIG. 3, entitled "Dry Dilute Carbonation," was performed with a carbon dioxide concentration of 20.6%. The graph in FIG. 4, entitled "Thin Film Carbonation," was performed with 100% carbon dioxide. From this a conclusion has been reached that in order to achieve desired carbonation targets within a reasonable time one should use a carbon dioxide concentration of at least 40%. Although carbonation can be performed with carbon dioxide concentrations of less than 40%, it is not viewed as being efficient in view of the time that is required to achieve full carbonation.

Advantages:

the method provides a safe and economical method of utilizing large quantities of wood ash residue as a soil amendment, that is presently disposed of in land fills;

the method can use waste combustion gases rich in carbon dioxide and addresses atmospheric environmental concerns by reducing greenhouse gas emissions.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method of treatment of wood ash residue, comprising the steps of:

wetting the wood ash residue with less than 10% water as determined by weight;

reacting the wetted wood ash residue with carbon dioxide gas, such that mineral oxides and hydroxides are converted to carbonates, thereby reducing the caustic nature of the wood ash residue, the step of reacting the wetted wood ash residue with carbon dioxide gas being performed with a carbon dioxide concentration of at least 40%; and continuing to react the wetted wood ash residue, while monitoring both reductions in electrical conductivity and reductions in pH, until the resulting wood ash residue is sufficiently carbonated to have a reduction in electrical conductivity of at least 30% and a pH of 8.7 or less.

2. The method as defined in claim 1, the step of continuing to react the wetted wood ash residue being continued until the wood ash residue is at least 80% carbonated.

3. A method of treatment of wood ash residue, comprising the steps of:

wetting the wood ash residue with less then 10% water as determined by weight;

reacting the wetted wood ash residue with carbon dioxide gas, such that mineral oxides and hydroxides are converted to carbonates thereby reducing the caustic nature of the wood ash residue, the carbon dioxide gas having a carbon dioxide concentration of at least 40%; and continuing to react the wetted wood ash residue while monitoring reductions in electrical conductivity until the resulting wood ash residue is at least 80% carbonated and the reduction in electrical conductivity is at least 30%.

4. A method of treatment of wood ash residue, comprising the steps of:

wetting the wood ash residue with less then 10% water as determined by weight;

reacting the wetted wood ash residue with carbon dioxide gas, such that mineral oxides and hydroxides are converted to carbonates thereby reducing the caustic nature of the wood ash residue, the carbon dioxide gas having a carbon dioxide concentration of at least 40%; and continuing to react the wetted wood ash residue while monitoring reductions in pH until the resulting wood ash residue is at least 80% carbonated and pH is reduced to 8.7 or less.

5. A method of treatment of wood ash residue, comprising the steps of:

wetting the wood ash residue with less then 10% water as determined by weight;

reacting the wetted wood ash residue with carbon dioxide gas, such that mineral oxides and hydroxides are converted to carbonates thereby reducing the caustic nature of the wood ash residue, the carbon dioxide gas having a carbon dioxide concentration of at least 40%; and continuing to react the wetted wood ash residue while monitoring both reductions in electrical conductivity and reductions in pH until the resulting wood ash residue is at least 80% carbonated and the reduction in electrical conductivity is at least 30% and pH is reduced to 8.7 or less.

* * * * *

UNITED STATES PATENT AND TRADEMARK OFFICE
CERTIFICATE OF CORRECTION

PATENT NO. : 7,658,780 B2 Page 1 of 1
APPLICATION NO. : 11/461947
DATED : February 9, 2010
INVENTOR(S) : R. Johnson et al.

It is certified that error appears in the above-identified patent and that said Letters Patent is hereby corrected as shown below:

| COLUMN | LINE | |
|---|---|---|
| 6 (Claim 3, | 54 line 3) | "then" should read --than-- |
| 7 (Claim 4, | 1 line 3) | "then" should read --than-- |
| 8 (Claim 5, | 1 line 3) | "then" should read --than-- |

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,658,780 B2 |
| APPLICATION NO. | : 11/461947 |
| DATED | : February 9, 2010 |
| INVENTOR(S) | : Johnson et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 637 days.

Signed and Sealed this

Thirtieth Day of November, 2010

David J. Kappos
*Director of the United States Patent and Trademark Office*